US007257577B2

(12) United States Patent
Fagin et al.

(10) Patent No.: US 7,257,577 B2
(45) Date of Patent: Aug. 14, 2007

(54) SYSTEM, METHOD AND SERVICE FOR RANKING SEARCH RESULTS USING A MODULAR SCORING SYSTEM

(75) Inventors: Ronald Fagin, Los Gatos, CA (US); Kevin Snow McCurley, San Jose, CA (US); Jasmine Novak, Mountain View, CA (US); Shanmugasundram Ravikumar, Cupertino, CA (US); Dandapani Sivakumar, Cupertino, CA (US); John Anthony Tomlin, Sunnyvale, CA (US); David Paul Williamson, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 10/841,391

(22) Filed: May 7, 2004

(65) Prior Publication Data
US 2005/0262050 A1   Nov. 24, 2005

(51) Int. Cl.
*G06F 17/30* (2006.01)
(52) U.S. Cl. .................. 707/7; 707/3; 707/4; 707/5; 707/6; 707/104.1
(58) Field of Classification Search .................. 707/3, 707/4, 5–7, 104.1
See application file for complete search history.

(56) References Cited

U.S. PATENT DOCUMENTS

| | | | |
|---|---|---|---|
| 5,983,227 A * | 11/1999 | Nazem et al. ................. | 707/10 |
| 6,112,203 A * | 8/2000 | Bharat et al. .................. | 707/5 |
| 6,169,986 B1 * | 1/2001 | Bowman et al. ............... | 707/5 |
| 6,285,999 B1 | 9/2001 | Page ............................. | 707/5 |
| 6,553,364 B1 * | 4/2003 | Wu ............................... | 707/1 |
| 6,701,312 B2 * | 3/2004 | Lau et al. ...................... | 707/5 |
| 6,738,764 B2 * | 5/2004 | Mao et al. ..................... | 707/5 |
| 6,772,150 B1 * | 8/2004 | Whitman et al. ............... | 707/6 |
| 6,778,997 B2 * | 8/2004 | Sundaresan et al. ......... | 707/104.1 |
| 6,785,671 B1 * | 8/2004 | Bailey et al. .................. | 707/3 |
| 6,901,399 B1 * | 5/2005 | Corston et al. ................ | 707/6 |
| 6,911,475 B1 * | 6/2005 | Cesaro et al. ................ | 514/567 |

(Continued)

OTHER PUBLICATIONS

M. Dodge et al., "Exposing the 'Second Text' of Maps of the Net," JCMC 5 (4), Jun. 2000.

(Continued)

*Primary Examiner*—Apu M. Mofiz
*Assistant Examiner*—Jessica N. Le
(74) *Attorney, Agent, or Firm*—Samuel A. Kassatly

(57) ABSTRACT

A modular scoring system using rank aggregation merges search results into an ordered list of results using many different features of documents. The ranking functions of the present system can easily be customized to the needs of a particular corpus or collection of users such as an intranet. Rank aggregation is independent of the underlying score distributions between the different factors, and can be applied to merge any set of ranking functions. Rank aggregation holds the advantage of combining the influence of many different heuristic factors in a robust way to produce high-quality results for queries. The modular scoring system combines factors such as indegree, page ranking, URL length, proximity to the root server of an intranet, etc, to form a single ordering on web pages that closely obeys the individual orderings, but also mediates between the collective wisdom of individual heuristics.

24 Claims, 6 Drawing Sheets

U.S. PATENT DOCUMENTS

| | | | | |
|---|---|---|---|---|
| 7,039,631 | B1* | 5/2006 | Finger, II | 707/3 |
| 2002/0078045 | A1* | 6/2002 | Dutta | 707/7 |
| 2002/0198869 | A1* | 12/2002 | Barnett | 707/3 |
| 2003/0088545 | A1* | 5/2003 | Subramaniam et al. | 707/3 |
| 2003/0177116 | A1* | 9/2003 | Ogawa | 707/4 |
| 2004/0103075 | A1* | 5/2004 | Kim et al. | 707/1 |
| 2005/0038894 | A1* | 2/2005 | Hsu et al. | 709/228 |
| 2005/0071465 | A1* | 3/2005 | Zeng et al. | 709/224 |
| 2005/0071776 | A1* | 3/2005 | Mansfield et al. | 715/805 |
| 2005/0149538 | A1* | 7/2005 | Singh et al. | 707/100 |

OTHER PUBLICATIONS

M. Bawa, et al. "Make it Fresh, Make it Quick—Searching a Network of Personal Webservers," available at: http://www-db.Stanford.edu/~bawa/Pub/uSearch/, on Mar. 22, 2004.

S. Raghavan et al., "Complex Queries over.Web Repositories," available at: http://www.vldb.org/conf/2003/papers/S03P01.pdf, on May 6, 2004.

J. W. Lehman, et al. "Knowledge-Based Searching with TOP-ICS®," available at: http://trec,nist.gov/pubs/trec2/papers/txt/20.txt, on Mar. 22, 2004.

"Social Network to Social Network Method," available at http://www.faculty.ucr.edu/~hanneman/SOC157/TEXT/C1SocialNetworkData.html, on Mar. 22, 2004.

J. Moody et al., "Dynamic Network Visualization: Methods for Meaning with Longitudinal Network Movies," available at: http://www.sociology.ohio-state.edu/jwm/NetMovies/Sub_CD/dynamics_nets_ public.html, on Mar. 22, 2004.

"SQL for Aggregation in Data Warehouses," available at: http:/www.lc.leidenuniv.nl/awcouse/oracle/server.920/aggreg.htm, on Mar. 22, 2004.

L. Page, et. al., "The PageRank citation ranking: Bringing order to the web", Technical report, Stanford Digital Library Technologies Project, 1998. Paper SIDL-WP-1999-0120.

C. Dwork, et. al. "Rank aggregation methods for the web", Proc. 10th WWW, pp. 613-622, 2001.

M. Najork, et. al., "Breadth-first search crawling yields high-quality pages", In Proc. 10th WWW, pp. 114-118, 2001.

* cited by examiner

SYSTEM, METHOD AND SERVICE FOR RANKING SEARCH RESULTS USING A MODULAR SCORING SYSTEM

FIELD OF THE INVENTION

The present invention generally relates to scoring or ranking documents with respect to a query term. In particular, the present invention relates to a method for scoring or ranking documents by aggregating many rankings into one using a rank aggregation method. Specifically, the present invention allows customization of the rank aggregation method for specific intranets, the WWW, and subsets of the WWW.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these web pages by means of computer software programs commonly known as Internet browsers. Due to the vast number of WWW sites, many web pages have a redundancy of information or share a strong likeness in either function or title. The vastness of the unstructured WWW causes users to rely primarily on Internet search engines to retrieve information or to locate businesses. These search engines use various means to determine the relevance of a user-defined search to the information retrieved.

The authors of web pages provide information known as metadata within the body of the document that defines the web pages. This document is typically written in, for example, hypertext markup language (HTML). A computer software product known as a web crawler systematically accesses web pages by sequentially following hypertext links (hyperlinks) from web page to web page. The crawler indexes the web pages for use by the search engines using information about a web page as provided by its address or Universal Resource Locator (URL), metadata, and other criteria found within the web page. The crawler is run periodically to update previously stored data and to append information about newly created web pages. The information compiled by the crawler is stored in a metadata repository or database. The search engines search this repository to identify matches for the user-defined search rather than attempt to find matches in real time.

A typical search engine has an interface with a search window where the user enters an alphanumeric search expression or keywords. The search engine sifts through available web sites for the search terms, and returns the search of results in the form of web pages in, for example, HTML. Each search result comprises a list of individual entries that have been identified by the search engine as satisfying the search expression. Each entry or "hit" comprises a hyperlink that points to a Uniform Resource Locator (URL) location or web page.

An exemplary search engine is the Google® search engine. An important aspect of the Google® search engine is the ability to rank web pages according to the authority of the web pages with respect to a search. The ranking technique used by the Google® search engine is the PageRank algorithm. Reference is made to L. Page, et. al., "The PageRank citation ranking: Bringing order to the web", Technical report, Stanford Digital Library Technologies Project, 1998. Paper SIDL-WP-1999-0120. The PageRank algorithm calculates a stationary distribution of a Markov chain induced by hyperlink connectivity on the WWW. This same technique used by the PageRank algorithm applies to intranets or subsets of the WWW. Although the PageRank algorithm has proven to be useful, it would be desirable to present additional improvements.

Search engines typically face a problem with having too many results that contain the query terms. For example, the query "db2" appears in over 180,000 different URLs on one company intranet. The problem of indexing on a large corpus of text such as an intranet or the World Wide Web becomes one of ranking the many results by their importance and relevance to the query, so that the user need not peruse all of the results to satisfy an informational need.

Many different features can be used to determine the relevance or authority of a document to given query. In the case of the World Wide Web, the most successful techniques (as exemplified by Google) are a combination of indexing the content, indexing of anchortext, and use of PageRank to provide a static ordering of authority. Many techniques have been suggested for producing good results to queries, including considering the indegree in the weblink graph, TF*IDF and lexical affinity scoring techniques, and heavier weighting for terms that appear in titles or larger fonts. Some of these ranking techniques (e.g., ranking by frequency of terms in anchortext) are query-dependent, and can only be computed in response to a query. Others (e.g., PageRank) are static, and do not depend on the query that has been submitted.

There is a conflict between the desire to have a good searchable intranet and the inherent diversification of the way that information is presented using web technology. In many ways, this conflict mirrors the tensions that exist on the Internet. People want their Internet pages to be seen, and Internet implementers want their information to be discoverable. At the same time, myriad other factors such as social forces, technology limitations, and a lack of understanding of search by web developers can lead to decisions that conflict with good search results.

Intranet search is different from Internet search for several reasons: the queries asked on the intranet are different, the notion of a "good answer" is different, and the social processes that create the intranet are different from those that create the Internet. Queries on an intranet tend to be jargon-heavy and use various acronyms and abbreviations that reflect the structure of the organization or company that uses that intranet. In addition, the correct answer to a query is often specific to a site, geographic location, or an organizational division, but the user often does not make this intent explicit in the query. Context-sensitive search is a common problem for many intranets and the Internet.

A great deal of work has been done over the years to assess the effectiveness of different search techniques, but their effectiveness tends to be a function of the underlying corpus being searched and the characterization of the queries and users that are accessing the data. Each intranet is an island unto itself, reflecting the character of the organization that it represents. For this reason, what works well for the Internet may not work well for an intranet, and what works for one intranet may not work well for another. Part of this is derived from the nature of the organization. In a university intranet, desirable searching features may comprise free speech and diversity of opinion. In a corporation, desirable searching features may comprise hierarchical distribution of authority and focus upon the mission. Consequently, ranking functions need to reflect the particular value system of the organization whose data is being indexed. This suggests that customization is an important feature of an intranet search engine.

Within an organization, employees tend to fulfill a role that is consistent with their job description. Thus an employee of the marketing department may have a different need than an employee of a research division, and a lawyer may have a different need than a programmer. This suggests that ranking methods for search engines should provide personalization of ranking functions.

A simple approach to mixing different features is to apply numerical weights to the features and use a mixing function to combine these numerical weights into a single score for ranking documents. However, the scales and distribution of scores from different features can be incomparable, and it is difficult to arrive at an optimal mixing function. One approach to addressing this problem that has been suggested previously uses Bayesian probabilistic models for retrieval, treating the different scores given to documents as probabilities and merging them according to a probabilistic model. Reference is made to W. Croft, "Combining approaches to information retrieval", *Advances in Information Retrieval*. Kluwer Academic Publishers, 2000; D. Hiemstra. "*Using Language Models for Information Retrieval*", PhD thesis, University of Twente, Twente, The Netherlands, 2001; W. Kraaij, et. al., "The importance of prior probabilities for entry page search", In *Proc. 25th SIGIR*, pages 27-34, 2002; T. Westerveld, et. al., "Retrieving web pages using content links", URLs and anchors. In *Proc. 10th TREC*, pages 663-672, 2001. Although this approach has proven to be useful, it would be desirable to present additional improvements.

What is therefore needed is a system, a service, a computer program product, and an associated method for ranking scales and distributions of scores from different ranking systems based on different ranking features. The solution should be customizable to meet the needs and characteristics of a specific network, intranet, or client. The need for such a solution has heretofore remained unsatisfied.

SUMMARY OF THE INVENTION

The present invention satisfies this need, and presents a system, a computer program product, and an associated method (collectively referred to herein as "the system" or "the present system") for ranking search results using a rank aggregation method to allow flexible implementation of text search processors. The present system introduces a means by which many different features of documents can be merged to give an ordered list of results. Further, the ranking functions of the present system can easily be customized to the needs of a particular corpus or collection of users such as, for example, an intranet. Advantageously, rank aggregation is independent of the underlying score distributions between the different factors and can be applied to merge any set of ranking functions. While discussed in terms of an intranet or the Internet, the present system is applicable as well to, for example, indexing email repositories, newsgroups, instant messaging logs, and the like.

Rank aggregation holds the advantage of combining the influence of many different heuristic factors in a robust way to produce high-quality results for queries. A rank aggregation processor takes several ranked lists, each of which ranks part of a collection of candidates (web pages), and produces an ordering of all the candidates in the union of the lists. Reference is made to C. Dwork, et. al. "Rank aggregation methods for the web", *Proc. 10th WWW*, pages 613-622, 2001. Ordering produced by the rank aggregation processor is aimed at minimizing the total number of inversions, that is, the total number of "upsets" caused by the output ordering with respect to initial orderings. Rank aggregation is employed as a tool to combine initial rankings of pages or documents (produced by various ranking functions) into an aggregate ranking that is improved over any one of the constituent ranking functions.

There are numerous factors that affect the ranking of search results The present system uses rank aggregation to combine many ranked lists into a single ranking of results. The present system combines factors such as indegree, page ranking, URL length, proximity to the root server of an intranet, etc, to form a single ordering on web pages that closely obeys the individual orderings, but also mediates between the collective wisdom of individual heuristics. Rank aggregation is resilient to spam; specifically, if one ranking is manipulated to influence the results, the aggregation of different rankings still reflects the collective wisdom of the majority of the rankings. Consequently, the present system produces robust rankings that are not as subject to manipulation as conventional techniques.

The present system provides the opportunity to customize and personalize search results within a single software architecture. When deploying a search engine in many different intranets, the ranking function can be tailored to represent the set of users and that structure of the organization. For example, a client may require a particular server to supply all answers to human resource questions. The present system incorporates this requirement incorporated into the ranking function without the need to change the underlying text index software. Moreover, a "best" answer to a query may depend on the location of a user asking the question. For example, the query "retirement" can have different answers if the query is submitted in Zurich than if it is submitted in Raleigh. The present system can incorporate the geographical location of a user without changing the underlying indexing software that returns ranked lists of results.

At the top level, a text search application takes a set of documents in and produces a graded set of documents. More generally, a text search application typically comprises the following features: a collection of documents, a set of users, a set of scoring modules, and a rank aggregation processor. In the case of the web, information about the collection of documents is often gathered into one place via a web crawler, but the construction of an index can also be done in a distributed fashion where the documents reside. The set of users issue queries on the documents and receive lists of results from the system that suggest which documents are relevant to the query.

The set of scoring modules and the rank aggregation processor comprise a set of heuristics and scoring methods that take as input the set of documents and produce a graded set of documents, based on heuristics for relevance or authoritativeness. The heuristics comprise several categories: static orderings of the documents, dynamic orderings that depend on the particular query, and dynamic orderings that depend on the particular user. Dynamic orderings that depend on the particular query and dynamic orderings that depend on the particular user are typically used to decide which documents are relevant to a query. Static orderings of the documents are used to discriminate between which of the relevant documents to rank first.

The static orderings of the documents are based on features of the documents themselves but independent of the query or the user. Examples of static orderings of documents comprise PageRank, document length, media type, position in a hierarchy, rankings by authors, rankings by an independent authority, etc.

Dynamic orderings that depend on the particular query comprise, for example, the number of times that a query term appears in the document and other documents (TF*IDF), whether the query terms appear in a title, whether the query terms appear in anchor text for a document, whether the query terms appear near each other in the document (e.g., lexical affinities), the placement of query terms within a document, etc. For example, documents that contain terms early in their text or within a title may be more relevant than documents that contain the query term in a footnote or appendix. Dynamic orderings that depend on the particular query may be implemented within a traditional inverted keyword index or may be implemented outside the index to allow customization without the need to modify the index software.

Dynamic orderings that depend on the particular user comprise, for example, geographical proximity scores for the user, role or job title of the user within an organization, educational level, history of previous queries by the user, etc.

The present system may be embodied in a utility program such as a modular scoring utility program. The modular scoring utility program is customized for a client's intranet and particular needs. The present system provides means for the user to identify an intranet, the Internet, a database, or other set of data as input data from which query results may be scored by the present system. The present system also provides means for the user to specify a query in the form of text input. A user specifies the input data and the query and then invokes the modular scoring utility program to produce a scored set of documents.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Internet: A collection of interconnected public and private computer networks that are linked together with routers by a set of standards protocols to form a global, distributed network.

Inlink: Links coming into a web page or document such as an HTML document from another web page or document.

Intranet: A network that is internal to a company or organization that may not be connected to the Internet, but that uses standard Internet protocols and has some similar functions.

Link: A pointer in a web page or in a document such as an HTML document that leads to another web page or to another place within the same document; also called a hyperlink.

Rank: An index assigned to a document/web page having value 1 through the number of documents, with the highest rank corresponding to 1.

Score: A numeric value (usual a fractional real number) assigned to a document/page by the scoring technique (e.g., pagerank) from which a ranking can be obtained.

URL (Uniform Resource Locator): A unique address that fully specifies the location of a content object on the Internet. The general format of a URL is protocol://server-address/path/filename, where the server-address is referenced as the host rank.

World Wide Web (WWW, also Web): An Internet client—server hypertext distributed information retrieval system.

Figure 1:
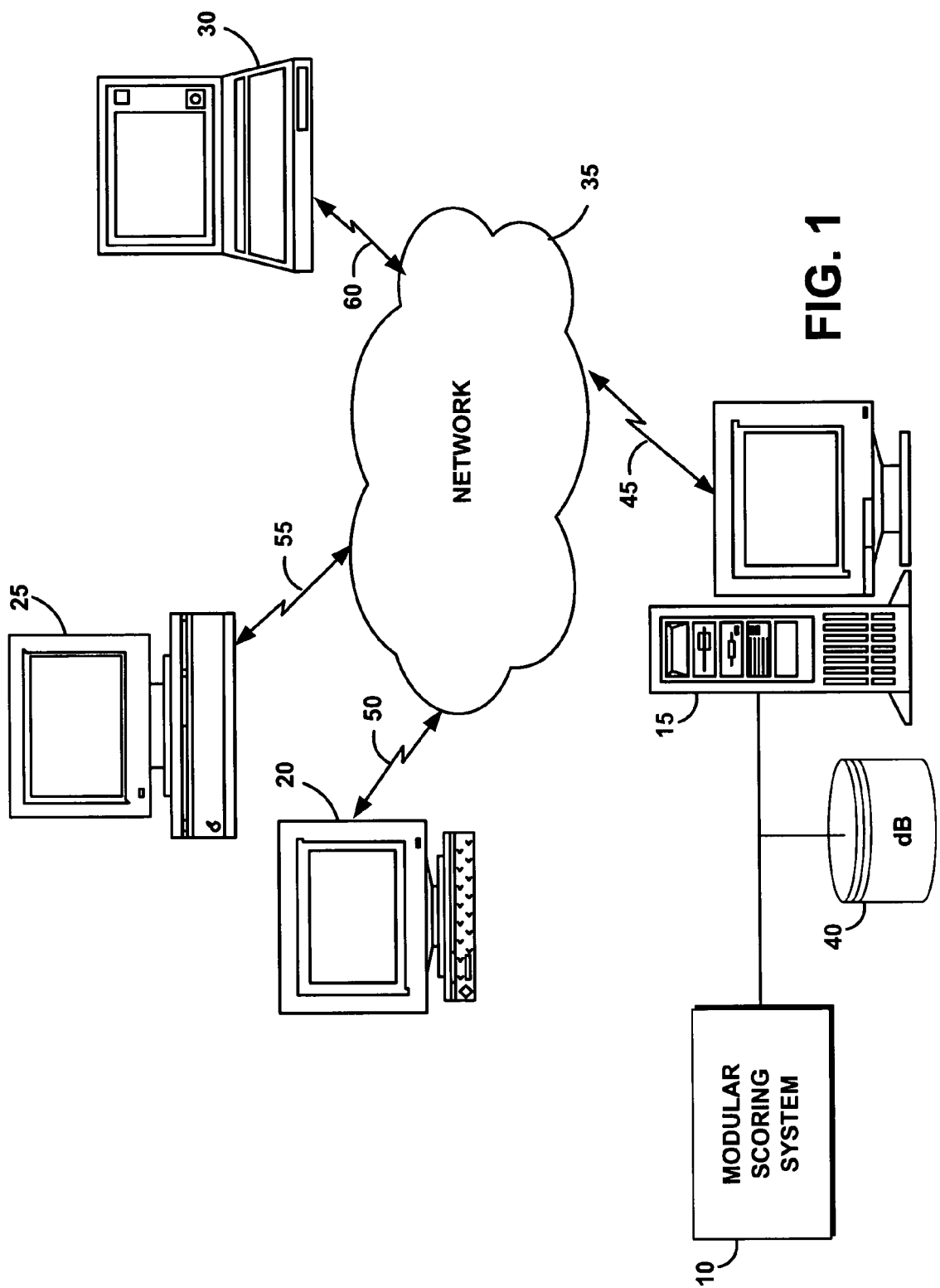
FIG. 1 is a schematic illustration of an exemplary operating environment in which a modular scoring system of the present invention can be used.

FIG. 1 portrays an exemplary overall environment in which a system, a service, a computer program product, and an associated method (the "system 10") for ranking search results using a modular scoring system according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

Users, such as remote Internet users, are represented by a variety of computers such as computers 20, 25, 30, and can access the host server 15 through a network 35. In one embodiment, system 10 scores results obtained by a search engine operated on host server 15. The results are accessed by system 10 from database (dB) 40. Users access the results of the scoring when performing key word searches on the Internet. In another embodiment, users provide an index or other hierarchical structure to system 10; system 10 then scores the index or other hierarchical structure for the user. Output from system 10 is stored on dB 40 or on a storage repository of the user.

Computers 20, 25, 30 each comprise software that allows the user to interface securely with the host server 15. The host server 15 is connected to network 35 via a communications link 45 such as a telephone, cable, or satellite link. Computers 20, 25, 30, can be connected to network 35 via communications links 50, 55, 60, respectively. While system 10 is described in terms of network 35, computers 20, 25, 30 may also access system 10 locally rather than remotely. Computers 20, 25, 30 may access system 10 either manually, or automatically through the use of an application.

System 10 uses the term "graded set" to refer to a set of documents in which each document in the set of documents in the graded set comprises a numerical score. The numerical score is a relevance score as applied to a search term. In one embodiment, the numerical scores may all be equal in which case the graded set can be thought of as just a set. Graded sets are known as "fuzzy sets".

Figure 2:
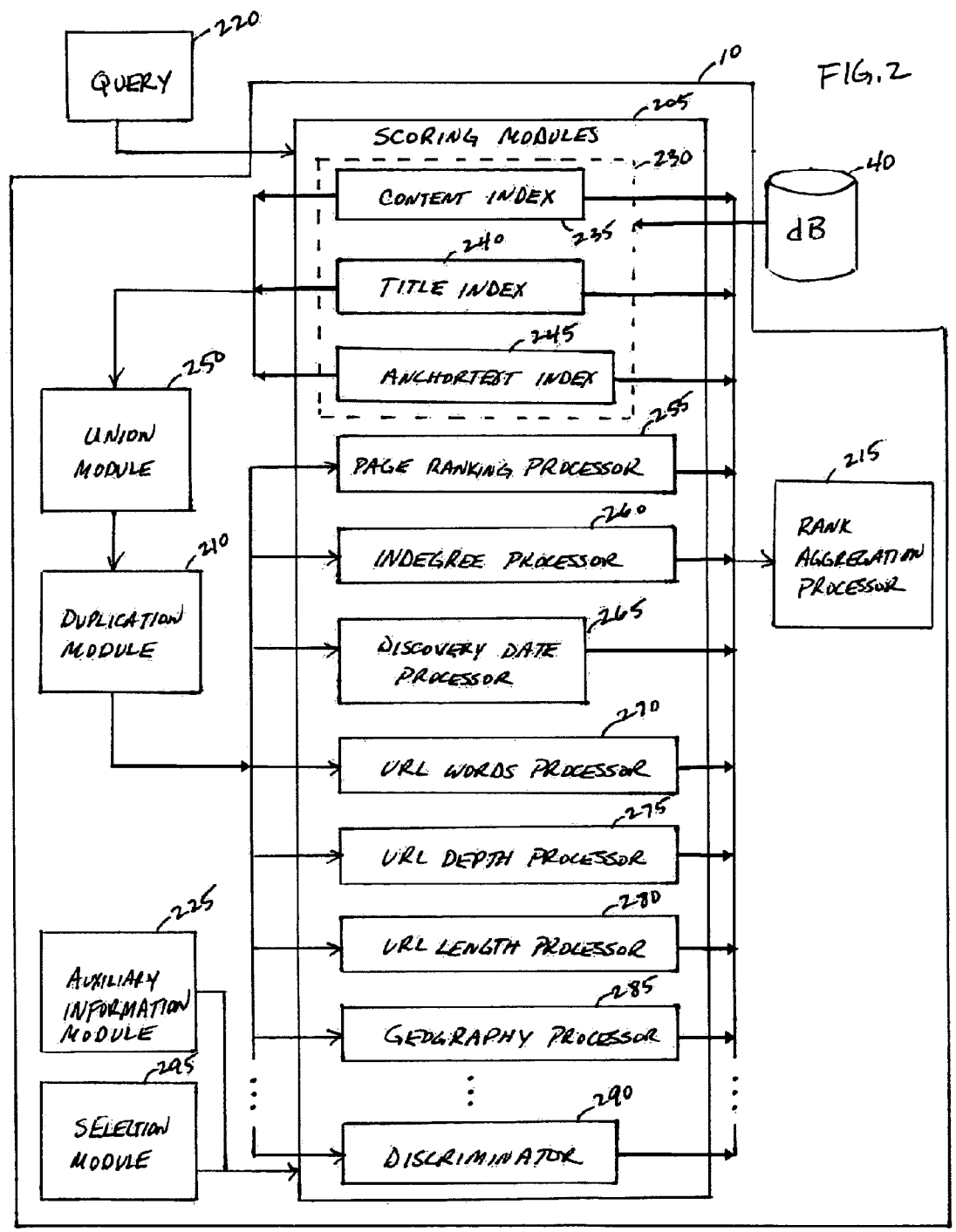
FIG. 2 is a block diagram of the high-level architecture of the modular scoring system of FIG. 1.

FIG. 2 illustrates a high-level hierarchy of system 10. System 10 comprises a set of scoring modules 205, a duplication module 210, and a rank aggregation processor 215. Each of the scoring modules 205 takes as input one or more graded sets of documents, an auxiliary information module 225, and (optionally) a query 220. Output from each of the scoring modules to the rank aggregation processor 215 is a ranked set of documents. In one embodiment, the rank aggregation processor 215 weights the outputs from each of the scoring modules 205 equally. In another embodiment, the rank aggregation processor 215 weights the outputs from each of the scoring modules 205 differently to meet scoring requirements of a specific client, user, intranet, or network.

An auxiliary information module 225 comprises data that may be used to customize the output of system 10 such as, for example, a user ID, a history of queries made by a user, a history of documents read by a user, a history of click-through results by a user, the geographic location of a user, the security classification of a user, a language set for a user, a set of documents for comparison uses during scoring, etc. Additional data may be used by the auxiliary information module 225 as needed to customize the output of system 10 to a client, intranet, or other network such as, for example, the Internet. In one embodiment, system 10 excludes auxiliary information module 225 from the process of scoring an aggregated set of graded documents.

The duplication module 210 takes as input one graded set of documents and produces two or more identical copies of the graded set of documents for use as needed by the scoring modules 205 and the rank aggregation processor 215. Input to the rank aggregation processor 215 comprises two or more ranked sets of documents produced by the scoring modules 205 and optional weights on the ranked sets of documents. The rank aggregation processor 215 produces a scored set of documents using rank aggregation to merge the outputs of some or all of the scoring modules 205 and produce a single scored set of documents.

Scoring modules 205 comprise a set of indices 230 such as, for example, a content index 235, a title index 240, and an anchortext index 245. Additional indices may be used as desired. The content index 235, the title index 240, and the anchortext index 245 take as input query 220 and find a set of documents in dB 40 that match the text of input query 220. The indices (e.g., content index, title index, anchortext index) provide pointers into the set of documents in dB 40 containing the query terms, and pass them to the union module 250 and to the rank aggregation processor 215.

The content index 235 comprises an inverted keyword index on document content. The title index 240 comprises an inverted keyword index on titles and metadata about the set of found documents. The anchortext index 245 comprises an inverted keyword index on anchortext for the set of found documents. The anchortext for a document typically comprises the highlighted text that a user clicks on to navigate to the document. The anchortext for a document may further comprise text surrounding the highlighted text. The title index 240 and anchortext index 245 comprise virtual documents.

Indices 230 provide graded lists of found documents that are scored using any suitable scoring analysis such as, for example, TF*IDF (Term Frequency Times Inverse Document Frequency). TF*IDF scores a document based on the number of terms a query term appears in a document: the higher the term frequency, the more relevant the document. Further, TF*IDF determines the relevance of a query term by the number of documents comprising the query term. TF*IDF places more weight on a less common term than a more common term as determined by the number of documents found with each term. Consequently, documents with the highest number of least common terms in the search query receive the highest score.

The outputs of indices 230 are combined in a union module 250 to form a single graded set of documents. The duplication module 210 duplicates the single graded set of documents as needed to provide inputs to the scoring modules 205. As needed, scoring modules 205 may also utilize query 220 and auxiliary information module 225 as input. Scoring modules 205 further comprise ranking or scoring processors such as, for example, a page ranking processor 255, an indegree processor 260, a discovery date processor 265, a URL word processor 270, a URL depth processor 275, a URL length processor 280, a geography processor 285, a discriminator processor 290, etc. This list of the scoring modules 205 is illustrative of the use of various scoring techniques by system 10. Any type of processor that produces a ranked set of documents from a graded set of documents may be used as one of the scoring modules 205.

The scoring modules 205 may be selected or deselected by selection module 295 as needed for a query, a user, a client, an intranet, etc. The page ranking processor 255 ranks a graded set of documents utilizing, for example, the PageRank algorithm. The computation of page ranking depends primarily on the link structure between web pages and is therefore useful for HTML content. Any type of page ranking processor may be used by system 10 such as, for example, any variation on the PageRank algorithm.

The indegree processor 260 ranks a graded set of documents based on the number of inlinks to the document. The indegree processor accords a rank to a document or web page that is proportional to the number of links into the document or web page.

The discovery date processor 265 ranks a graded set of documents based on the time that a crawler discovers a web page or a document. If a crawl is started from a single seed, then the order in which pages are crawled tends to be similar to a breadth first search through the link graph [reference is made to M. Najork, et. al., "Breadth-first search crawling yields high-quality pages", In *Proc. 10th WWW*, pages 114-118, 2001]. A sequence of times that a page is discovered by a hyperlink provides an approximation to the hyperlink graph distance of the page from the root seed of the network. The discovery date processor 265 accords a rank to a document or a web page that is inversely proportional to the distance of the document or web page from the root seed of the network. A document or a web page that is close to the root seed of the network receives a higher rank than a document or a web page that is further away from the root seed of the network.

The URL words processor 270 compares the text of the query term with a URL of a document or web page in the graded set. Input to the URL words processor 270 comprises query 220 and a graded set of documents. The URL words processor 270 accords a higher rank to a document that comprise a query term as a substring in the URL corresponding to that document.

The URL depth processor 275 accords a rank to a document or a web page that is inversely proportional to the number of delimiters such as a slash character ("/") that appear in the path component of the URL corresponding to that document or web page. The number of delimiters in the path component of a URL indicates the relative position of a document or a web page in a directory hierarchy; fewer delimiters indicate a higher position in the hierarchy.

Between two pages relevant to a query on the same host, the URL depth processor 275 favors a document or web page near the top of a directory hierarchy. Documents or web pages near the top of a directory hierarchy tend to be more general and have links to pages or documents lower in the hierarchy. Consequently, documents or web pages near the top of a directory hierarchy (having fewer delimiters) tend to be more authoritative than those documents or web pages at the bottom of the hierarchy (having more delimiters).

The URL length processor 280 accords a rank to a document or a web page that is inversely proportional to a length of the URL corresponding to that document or web page. When comparing documents comprising comparable content, the URL length processor 280 considers documents with shorter URL strings as more authoritative.

The geography processor 285 accords rank to a web page or a document based on a geographical location associated with that document or web page compared to the geographical location of a client or a user. The geography processor 285 is especially useful for worldwide organizations that have employees in many different countries. For example, a user queries a company intranet in Japan regarding company benefits. The geography processor 285 accords a high rank to documents about company benefits that correspond to Japan as opposed to documents that correspond to Sweden.

The discriminator 290 accords rank to a web page or a document in favor of certain classes of URLs over others. The favored URLs comprise, for example, those that end in a slash character ("/") or "index.html". The favored URLs further comprise those URLs that comprise a tilde character ("~"). These URL's are typically the main page of a site. The discriminator 285 further discriminates, for example, against certain classes of dynamic URLs containing a question mark character ("?"). The discriminator 290 is neutral on all other URLs and is easily customized to knowledge of a specific intranet or other network.

The rank aggregation processor 215 utilizes a variety of methods to aggregate the outputs of the scoring modules 205 such as, for example, positional methods, graph methods, or Markov chain methods. When using positional methods, the rank aggregation processor 215 gives each document an output score that is computed as a function of the various ranks received by a document or a web page from the scoring modules 205. The output score assignment may be determined by, for example, the mean rank or the median rank. A document or a web page is then scored by the output rank received.

The graph method creates a graph of 2n vertices $D_1, \ldots, D_n, P_1, \ldots, P_n$, where n is the number of documents. Edges of the graph are of the form $(D_i, P_j)$. A "cost" associated with the edge $(D_i, P_j)$ reflects the badness of scoring document i as the $j^{th}$ best document, where "badness" corresponds to divergence from an ideal. The rank aggregation processor 215 determines the costs from the input graded sets. As an example, if document i receives ranks $R_1, \ldots, R_k$ from the k input graded sets, the rank aggregation processor 215 may define the cost of $(D_i, P_j)$ as the sum of the quantities $|(j-R_t)|$, for $t=1, \ldots, k$. Once these costs have been defined, a "minimum-cost perfect matching" is computed. A perfect matching assigns a unique position (score) j to each document i. The unique position j places document i in a scored aggregate list of documents.

The Markov chain method creates a graph of n vertices $D_1, \ldots, D_n$ where n is the number of documents. The edges are of the form $(D_i, D_j)$, and the weight of the edge $(D_i, D_j)$ reflects perceived improvement of $D_j$ over $D_i$ by the input graded sets. For example, if a majority of the input ranked sets rank $D_j$ above $D_i$, then the weight is 1, else it is 0. The weights of the out-going edges of each vertex $D_i$ are normalized so that their sum is exactly 1. The rank aggregation processor 215 then determines the stationary probability distribution of a random walk on this graph via an eigenvector computation. The rank aggregation processor 215 then sorts the web pages or documents as represented by the vertices in decreasing order of stationary probability, yielding the final score of the documents [reference is made to J. Allan, et. al., "INQUERY and TREC-9". In *Proc. 9th TREC*, pages 551-562, 2000].

Figure 3:
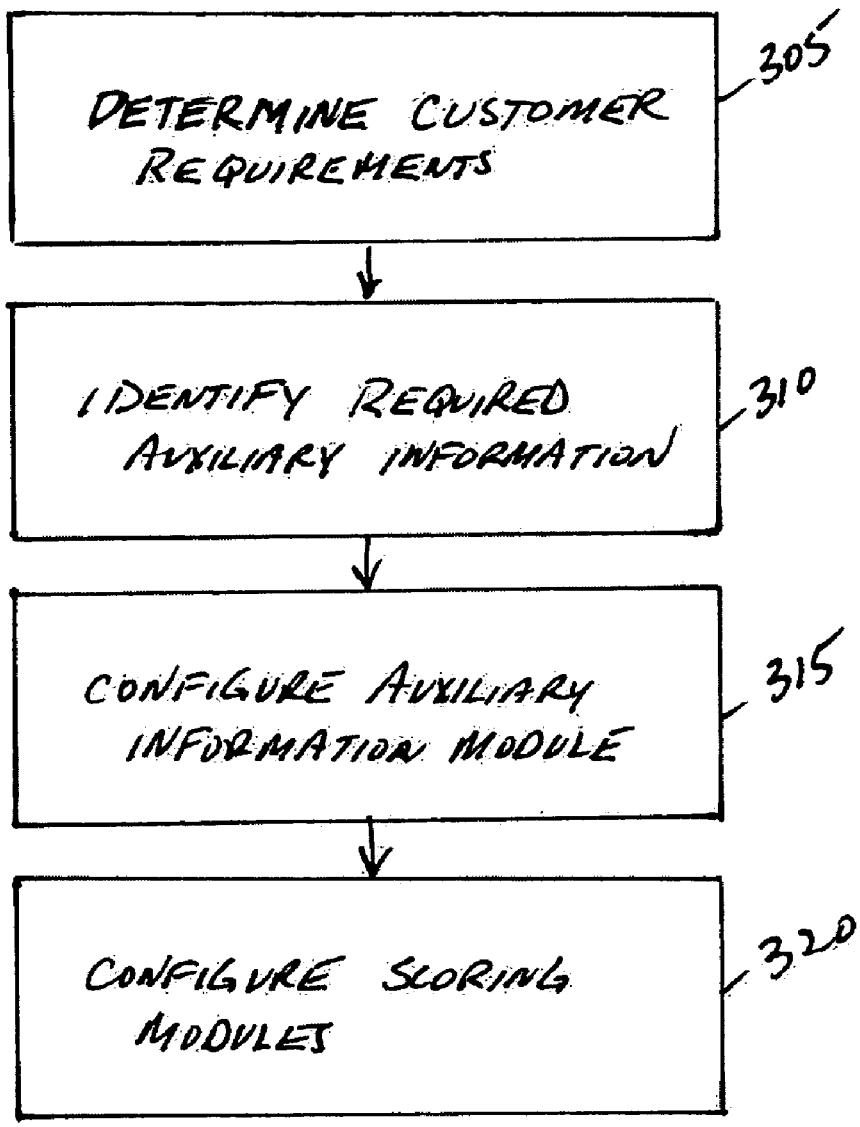
FIG. 3 is a process flow chart illustrating a method of configuring the modular scoring system of FIGS. 1 and 2.

System 10 can be configured to meet the specific needs of a client. FIG. 3 illustrates a method 300 of configuring system 10 for a specific client. Customer requirements are determined (step 305) and required auxiliary information is identified (step 310). Customer requirements and required auxiliary information are used to configure the auxiliary information module 225 (step 315) and configure scoring modules 205 for use by the client (step 320). For example, a client having a homogeneous workforce that operates in one geographic area does not require a geography processor 285. As another example a user may wish to use in-degree or pagerank, but not both.

Figure 4:
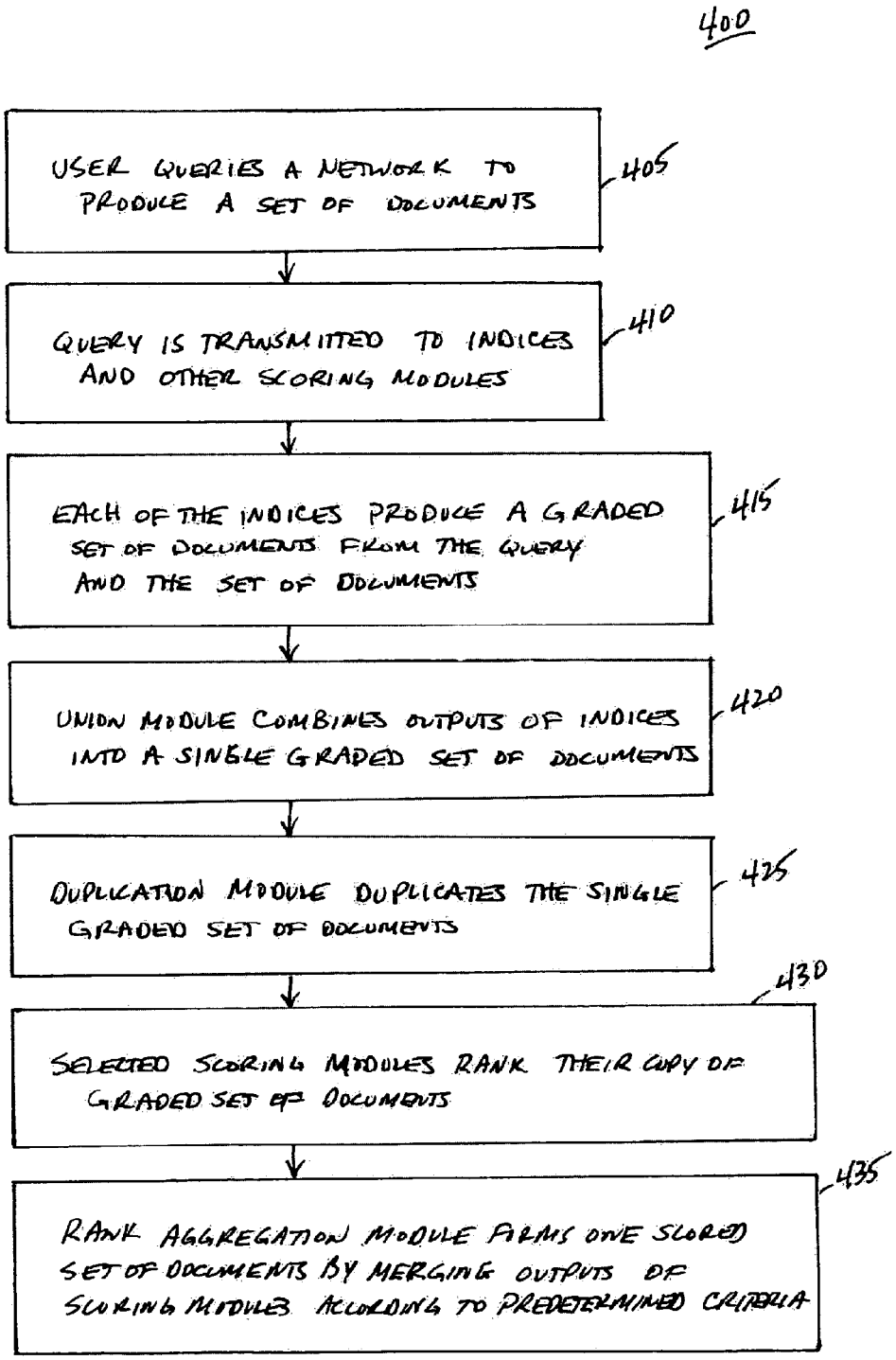
FIG. 4 is a process flow chart illustrating a method of operation of the modular scoring system of FIGS. 1 and 2.

FIG. 4 illustrates a method 400 of operation of system 10. A user enters a query 220 (FIG. 2)). The query is transmitted to indices 230 and optionally to other scoring modules 205 (step 410). Each of the indices 230 produces a graded set of documents from the query (step 415).

The union module 250 combines outputs of indices 230 into a single graded set of documents (step 420). The duplication module 210 duplicates the single graded set of documents as needed for selected scoring modules 205 (step 425). The scoring modules 205 are selected for a specific configuration as required by the client. The scoring modules 205 score their copy of the graded set of documents (step 430). The rank aggregation module 215 forms a single scored set of documents by merging and scoring the outputs of the scoring modules 205 according to predetermined criteria selected to meet client requirements.

The scoring modules 205, the duplication module 210, and the rank aggregation processor 215 can be configured within system 10 in a variety of combinations as necessary to refine the scoring process and achieve performance desired by the client. The selection of a configuration may be achieved by mathematical considerations or by comparison on the basis of human trials.

Figure 5:
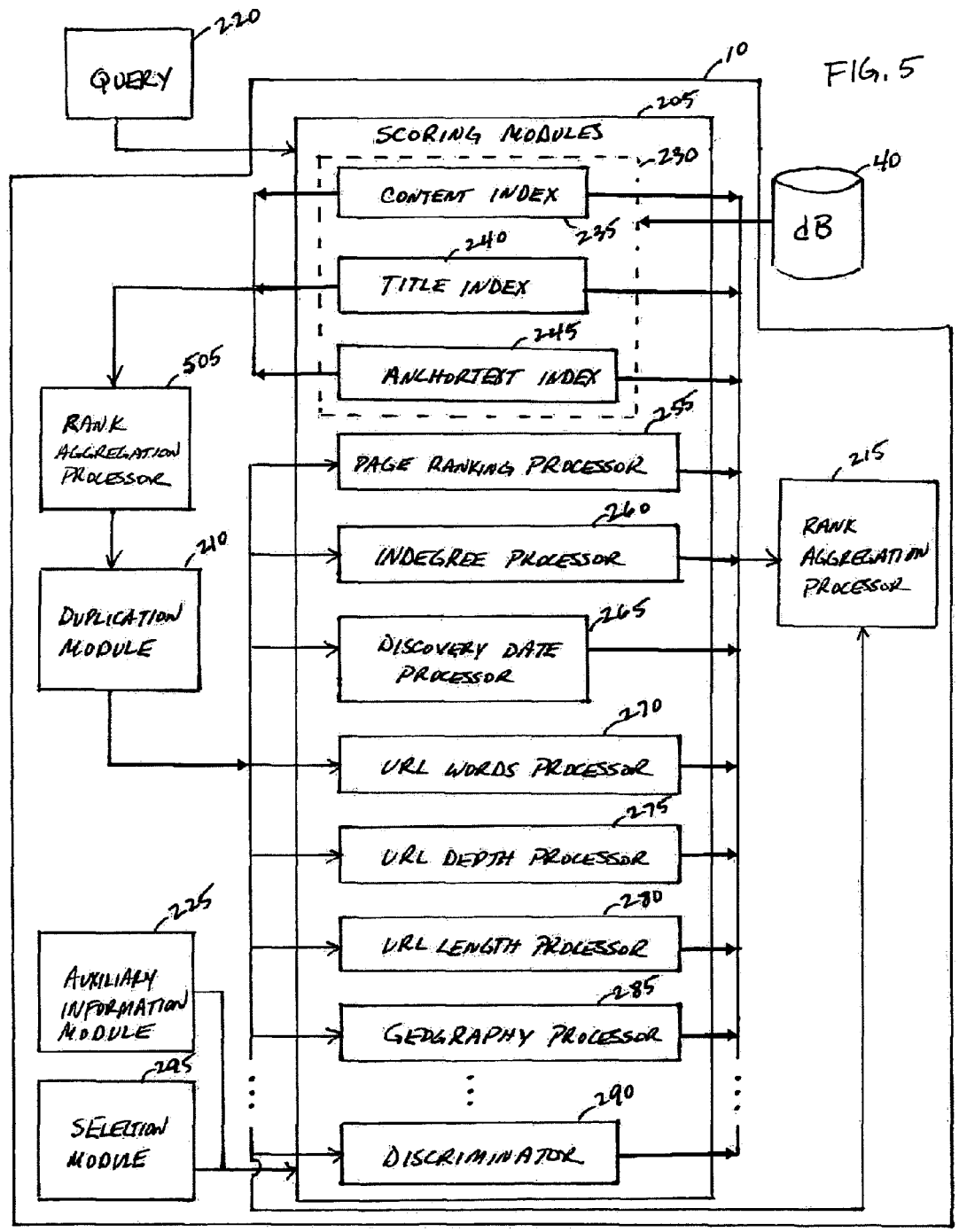
FIG. 5 is a block diagram of the high-level architecture of one embodiment of the modular scoring system of FIGS. 1 and 2.

FIG. 5 illustrates a high-level hierarchy of one embodiment of system 10 in which two levels of aggregation are used. These two levels of aggregation can result in different scores by giving different weights to different features in the scoring process. A rank aggregation processor 505 processes outputs of indices 230 to create an initial scored set for analysis by selected scoring modules 205 and the rank aggregation processor 215.

Figure 6:
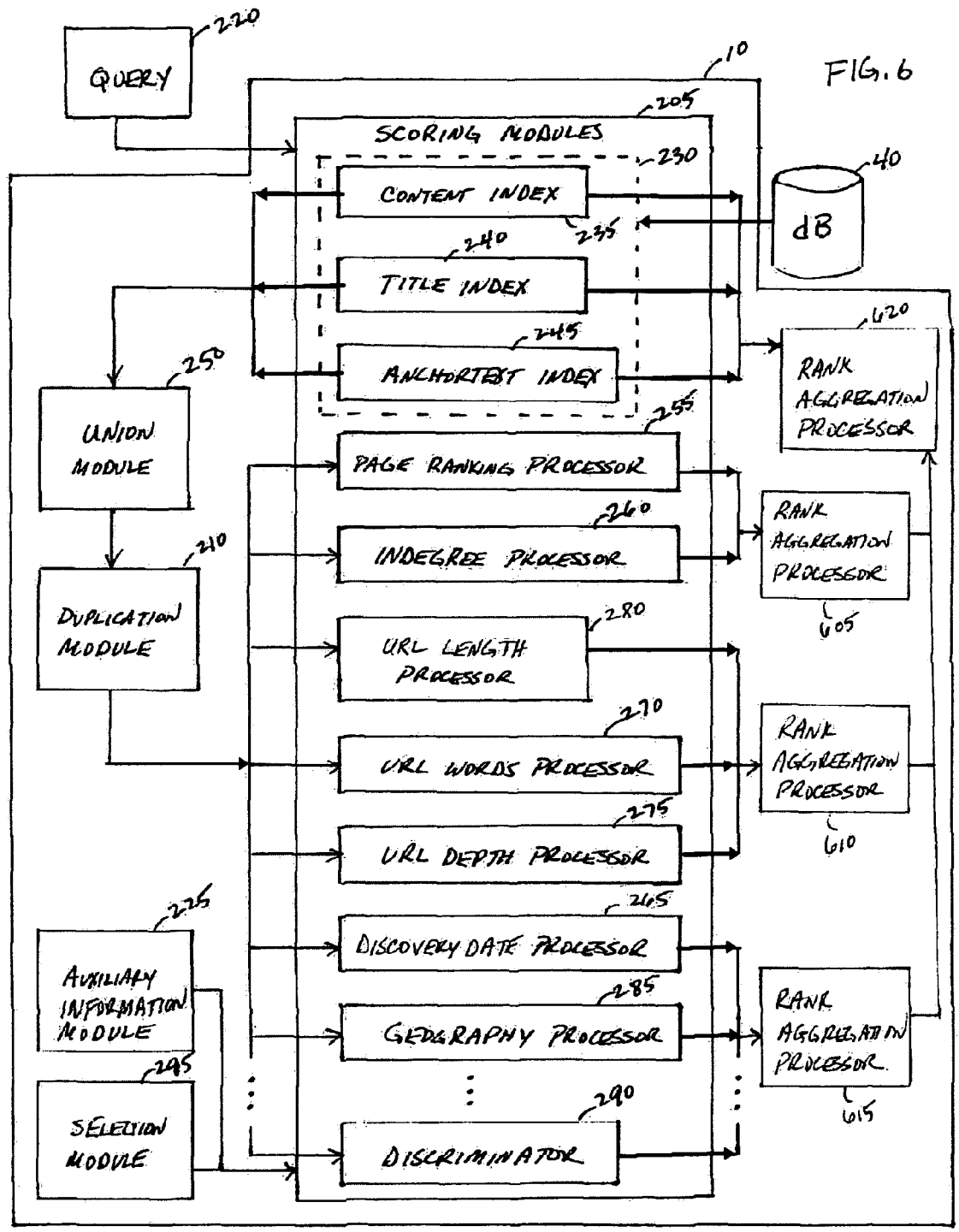
FIG. 6 is a block diagram of the high-level architecture of one embodiment of the modular scoring system of FIGS. 1 and 2.

FIG. 6 illustrates a high-level hierarchy of another embodiment of system 10 in which two levels of aggregation are used in a different configuration. A rank aggregation processor processes outputs of similar scoring modules 205 prior to an overall rank aggregation. For example, outputs from the page ranking processor 255 and the indegree processor 250 are aggregated together and scored by a rank aggregation processor 605. Outputs from the URL length processor 280, the URL words processor 270, and the URL depth processor 275 are aggregated together and scored by a rank aggregation processor 610. Outputs from the discovery date processor 265, the geography processor 285, the discriminator 290, etc., are aggregated together and scored by a rank aggregation processor 615.

The outputs of the rank aggregation processor 605, the rank aggregation processor 610, and the rank aggregation processor 615 are intermediate scored sets of documents that are then processed by a rank aggregation processor 620 along with output from indices 230. In this embodiment, the rank aggregation processor 605, the rank aggregation processor 610, and the rank aggregation processor 615 each process ranked sets of documents that have some elements that do not appear in the other sets. In other terms, the more commensurate scores are aggregated first, and then these ranks are used as input the final aggregation.

It is to be understood that the specific embodiments of the invention that have been described are merely illustrative of certain applications of the principle of the present invention. Numerous modifications may be made to a system and method for ranking search results using a modular scoring system described herein without departing from the spirit and scope of the present invention.

Moreover, while the present invention is described for illustration purpose only in relation to intranets, it should be clear that the invention is applicable as well to, for example, the WWW and to subsets of the WWW in addition to data derived from any source stored in any format that is accessible by the present invention. Furthermore, although the present invention is described in terms of the PageRank algorithm, it should be clear that the present invention is applicable as well to, for example, other search applications and ranking techniques without departing from the scope of the present invention. While the present invention has been described in terms of web search engines, it should be clear that the present invention is applicable as well to, for example, indexing email repositories, newsgroups, instant messaging logs, and the like.

What is claimed is:

1. A computer-implemented system for ranking search results, comprising:
   a plurality of indices for grading a set of pages to generate a graded set of pages;
   a plurality of selectable scoring modules that are selected by selection modules for selectively ranking the graded set of pages to generate a plurality of ranked sets of pages, according to an aggregated customizable ranking comprising a plurality of different scoring techniques;
   wherein the plurality of selectable scoring modules include a plurality of scoring modules selected by the selection modules and a plurality of scoring modules that have not been selected by the selection modules;
   a duplication module for duplicating the ranked sets of pages;
   the scoring modules selected by the selection modules independently scoring corresponding duplicates of the ranked sets of pages;
   wherein the plurality of scoring modules selected by the selection modules include:
      a first set of scoring modules for providing a first set of scores based on static orderings that are independent of a query and user defined criteria; and
      a second set of scoring modules for providing a second set of scores based on dynamic rankings that depend on the query and the user defined criteria;
   wherein each selectable scoring module scores one of the duplicates of the ranked set of pages according to one of the scoring techniques by generating the first and second sets of scores;
   a rank aggregation processor for merging the scored corresponding duplicate sets of pages into a single scored set of pages; and
   wherein the rank aggregation processor further ranks pages in the single scored set of pages.

2. The system of claim 1, wherein the single scored set of pages is scored as a function of relevance to a query.

3. The system of claim 1, wherein the single scored set of pages is scored as a function of authoritativeness.

4. The system of claim 1, wherein the set of pages is obtained by means of a query.

5. The system of claim 2, wherein an input to the rank aggregation processor comprises the query.

6. The system of claim 2, wherein an input to the rank aggregation processor comprises the graded set of pages.

7. The system of claim 2, wherein an input to at least some of the indices comprises the query.

8. The system of claim 2, wherein an input to at least some of the scoring modules comprises the query.

9. The system of claim 1, further comprising an auxiliary information module for customizing the system for a specific application.

10. The system of claim 1, further comprising a selection module for deselecting at least one of the scoring modules for customizing the system for a specific application.

11. A computer program product having a set of executable instruction codes stored on a computer readable medium, for ranking search results using, comprising:
   a first set of instruction codes for grading a set of pages to generate a graded set of pages;
   a second set of selectable instruction codes that are selected by selection modules for selectively ranking the graded set of pages to generate a plurality of ranked sets of pages, according to an aggregated customizable ranking comprising a plurality of different scoring techniques;
   wherein the plurality of selectable instruction codes include a plurality of scoring modules selected by the selection modules and a plurality of scoring modules that have not been selected by the selection modules;
   a third set of instruction codes for duplicating the ranked sets of pages;
   a fourth set of instruction codes selected by the selection modules for independently scoring corresponding duplicates of the ranked sets of pages;
   wherein the plurality of scoring modules selected by the selection modules include:
      a first set of scoring modules for providing a first set of scores based on static orderings that are independent of a query and user defined criteria; and
      a second set of scoring modules for providing a second set of scores based on dynamic rankings that depend on the query and the user defined criteria;
   wherein each selectable scoring module scores one of the duplicates of the ranked set of pages according to one of the scoring techniques by generating the first and second sets of scores;
   a fifth set of instruction codes for merging the scored corresponding duplicate sets of pages into a single scored set of pages; and
   a sixth set of instruction codes for ranking pages in the single scored set of pages.

12. The computer program product of claim 11, wherein the single scored set of pages is scored as a function of relevance to a query.

13. The computer program product of claim 11, wherein the single scored set of pages is scored as a function of authoritativeness.

14. The computer program product of claim 11, wherein the set of pages is obtained by means of a query.

15. The computer program product of claim 12, wherein the fifth set of instruction codes comprises the query.

16. The computer program product of claim 12, wherein the fifth set of instruction codes comprises the graded set of pages.

17. The computer program product of claim 12, wherein the first set of instruction codes comprises the query.

18. The computer program product of claim 12, wherein the second set of instruction codes comprises the query.

19. The computer program product of claim 11, further comprising a seventh set of instruction codes for customizing computer program product for a specific application.

20. The computer program product of claim 11, further comprising an eight set of instruction codes for deselecting at least one of the scoring modules for customizing the computer program product for a specific application.

21. A computer-implemented method for ranking search results using, comprising:
   grading a set of pages to generate a graded set of pages;
   a plurality of selectable scoring modules that are selected by selection modules selectively ranking the graded set of pages to generate a plurality of ranked sets of pages, according to an aggregated customizable ranking comprising a plurality of different scoring techniques;
   wherein the plurality of selectable scoring modules include a plurality of scoring modules selected by the selection modules and a plurality of scoring modules that have not been selected by the selection modules;
   duplicating the ranked sets of pages;
   the scoring modules selected by the selection modules independently scoring corresponding duplicates of the ranked sets of pages;
   wherein the plurality of scoring modules selected by the selection modules include:
      a first set of scoring modules for providing a first set of scores based on static orderings that are independent of a query and user defined criteria; and
      a second set of scoring modules for providing a second set of scores based on dynamic rankings that depend on the query and the user defined criteria;
   wherein each selectable scoring module scores one of the duplicates of the ranked set of pages according to one of the scoring techniques by generating the first and second sets of scores;
   merging the scored corresponding duplicate sets of pages into a single scored set of pages; and
   ranking pages in the single scored set of pages.

22. The method of claim 21, wherein the single scored set of pages is scored as a function of relevance to a query.

23. The method of claim 21, wherein the single scored set of pages is scored as a function of authoritativeness.

24. The method of claim 21, wherein the set of pages is obtained by means of a query.

* * * * *